United States Patent [19]

Stowell

[11] Patent Number: 5,443,604
[45] Date of Patent: Aug. 22, 1995

[54] POLISHING COMPOUND FOR PLASTIC SURFACES

[75] Inventor: Michael S. Stowell, New Ellenton, S.C.

[73] Assignee: The United States of America as represented by the United States Department of Energy, Washington, D.C.

[21] Appl. No.: 135,391

[22] Filed: Oct. 13, 1993

Related U.S. Application Data

[63] Continuation-in-part of Ser. No. 798,778, Nov. 27, 1991, abandoned.

[51] Int. Cl.$^6$ ................................................ C09C 1/68
[52] U.S. Cl. ........................................ 51/307; 51/308; 106/3; 106/8; 106/11
[58] Field of Search .................. 51/293, 308, 307; 106/3, 8, 11

[56] References Cited

U.S. PATENT DOCUMENTS

| | | | |
|---|---|---|---|
| 4,035,163 | 7/1977 | McLaughlin et al. | 51/303 |
| 4,071,333 | 1/1978 | Like | 106/3 |
| 4,222,747 | 9/1980 | Daugnet et al. | 51/301 |
| 4,225,349 | 9/1980 | Koshiyama et al. | 106/3 |
| 4,462,188 | 7/1984 | Payne | 106/3 |
| 4,683,001 | 7/1987 | Floyd et al. | 106/3 |
| 4,853,000 | 8/1989 | Potter | 106/8 |
| 4,859,359 | 8/1989 | De Matteo et al. | 106/3 |
| 4,935,039 | 6/1990 | Miyazaki et al. | 51/309 |
| 4,952,240 | 8/1990 | Smith | 106/8 |
| 5,094,687 | 3/1992 | Elepano | 106/11 |
| 5,154,759 | 10/1992 | Cifuentes et al. | 106/3 |
| 5,226,930 | 7/1993 | Sasaki | 51/308 |

OTHER PUBLICATIONS

Coes, Jr., *Abrasives*, pp. 37–38, 1971.
Jacobs, *The Abrasive Handbook*, pp. 29–31, 1928.

*Primary Examiner*—Deborah Jones
*Attorney, Agent, or Firm*—Brian R. Tumm; Harold M. Dixon; William R. Moser

[57] ABSTRACT

A polishing compound for plastic surfaces. The compound contains by weight approximately 4 to 17 parts at least one petroleum distillate lubricant, 1 to 6 parts mineral spirits, 2.5 to 15 parts abrasive particles, and 2.5 to 10 parts water. The abrasive is tripoli or a similar material that contains fine particles silica. Preferably, most of the abrasive particles are less than approximately 10 microns, more preferably less than approximately 5 microns in size. The compound is used on PLEXIGLAS TM, LEXAN TM, LUCITE TM, polyvinyl chloride (PVC) and similar plastic materials whenever a smooth, clear polished surface is desired.

17 Claims, 2 Drawing Sheets

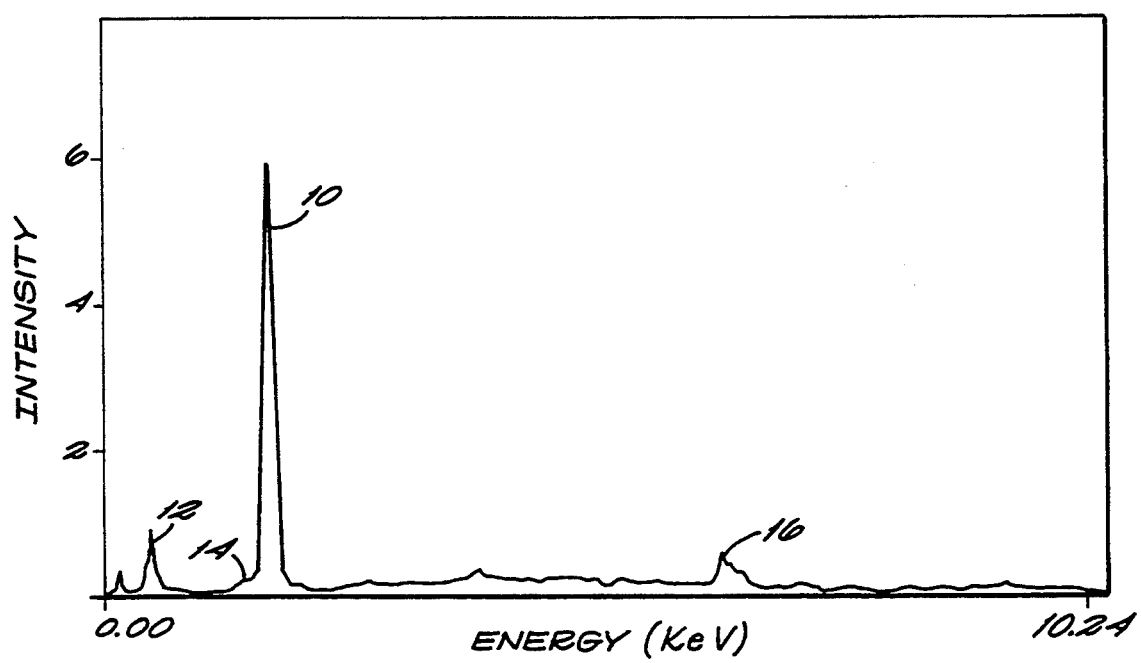

POLISHING COMPOUND FOR PLASTIC SURFACES

The present invention relates to polishing compounds for plastic surfaces. The United States Government has rights in this invention persuant to Contract No. DE-AC09-89SR18035 between the U.S. Department of Energy and Westinghouse Savannah River Company.

This application is a continuation-in-part of application Ser. No. 07/798,778, filed Nov. 27,1991, now abandoned.

BACKGROUND OF THE INVENTION

FIELD OF THE INVENTION

DISCUSSION OF BACKGROUND

PLEXIGLAS TM and other plastic materials are difficult to polish because their relatively soft surfaces are easy to scratch. Cut surfaces of clear plastics such as PLEXIGLAS TM have an opaque or translucent appearance due to a multitude of tiny scratches from the cutting tool even if the surface is smooth to the touch. Such cut surfaces are especially difficult to polish to a clear, transparent finish. Also, the cutting operation or act of polishing the cut surface can result in sufficient heat that the surface softens or melts, causing further optical distortion.

Rubbing and polishing compounds are used to facilitate polishing such cut surfaces. These compounds incorporate a powdered abrasive material for leveling and smoothing the surface. The abrasive is suspended in a suitable binder, which may include fatty substances, petroleum oils, surfactants, polishing accelerators, sedimentation-preventing agents, alcohol, and water. Frequently-used abrasives include the oxides of aluminum, iron, chromium, tin, titanium, magnesium, zinc:, manganese, and the rare earths. It should be noted that the term "compound", as used in the art, does not denote a compound in the chemical sense but rather a mixture of ingredients. It is in the latter sense that the term is used in this specification and the appended claims.

During polishing, the abrasive-containing compound is rubbed against the surface—generating considerable friction and heat—until the surface is level and the scratches left by cutting are too small to see. However, compounds intended for use on hard surfaces such as glass or metal can easily scratch softer, plastic materials. Some compounds do not effectively wet a roughly-finished plastic surface, so their polishing efficiency is reduced. Others do not lubricate the surface sufficiently, so the heat generated during polishing tends to soften and melt the plastic. Water-based compounds dry out during use, leaving a paste or powder residue that is difficult to work without causing excessive surface heating. The residue must frequently be removed from the surface of the plastic and the polishing pad, and fresh compound applied before polishing can be resumed.

A wide variety of cleaning and polishing compounds are available. Metal polishes contain an abrasive such as aluminum oxide suspended in a carrier. See, for example, Smith, U.S. Pat. No. 4,952,240, and Potter, U.S. Pat. No. 4,853,000. These compounds are designed for use on hard surfaces, and can easily scratch softer, plastic materials such as PLEXIGLAS TM, LEXAN TM, LUCITE TM, and polyvinyl chloride (PVC).

Other abrasive cleaners are designed for cleaning and conditioning hard ceramic surfaces such as range tops. For example, an abrasive powder mixture contains silicone oil absorbed in a water-soluble absorbent powder and a nonionic surfactant (McLaughlin, et al., U.S. Pat. No. 4,035,163).

Water-based polishing compounds for plastic lenses contain an aluminum oxalate or aluminum lactate abrasive (Miyazaki, et al., U.S. Pat. No. 4,935,039), calcined alumina (Koshiyama, et al., U.S. Pat. No. 4,225,349), or powdered cerium oxide (Dauguet, et al., U.S. Pat. No. 4,222,747). Often, these and similar compounds do not wet and lubricate the surface effectively, so it tends to heat and melt while being worked. The compounds also tend to dry out during use.

Presently available cleaners and polishers are often difficult to apply uniformly and tend to dry unevenly. The abrasive particles do not remain uniformly dispersed throughout the carrier, but settle out and form clumps. The clumped abrasive may produce scratches and other defects in the finished surface. Typically, long working times are required to produce a satisfactorily smooth and clear surface. It is especially difficult to produce surfaces which are suitable for use with optical equipment. Water-based compounds dry out during use, leading to excessive heat buildup and melting of a soft plastic surface. In addition, some compounds may contain substances which can irritate skin or corrode metal equipment.

A compound for polishing plastics to a condition of clarity or reflectivity suitable for optical equipment should contain a fine, uniformly dispersed abrasive in a lubricating and wetting medium that does not dry during polishing. It should also be economical and chemically stable, non-irritating to skin and non-corrosive.

SUMMARY OF THE INVENTION

According to its major aspects and broadly stated, the present invention is a polishing compound containing an abrasive, at least one petroleum distillate lubricant, mineral spirits and water. Preferably, the compound contains by weight approximately 2.5 to 15 parts abrasive particles, 4 to 17 parts lubricant, 1 to 6 parts mineral spirits, and 2.5 to 10 parts water. Fillers, coloring and fragrance agents, and additional ingredients such as hydrogenated fats and other lubricants may be added if desired. The proportions of the ingredients are varied in accordance with the particular application. Thicker formulations containing relatively more abrasive are effective polishers, while thinner formulations containing relatively more liquid are useful as cleaners.

When used to polish a surface, the compound remains in workable condition on the polishing pad and the workpiece, so the operator does not need to stop polishing in order to clean dried material off the workpiece or polishing equipment, as with water-based polishes. When polishing is complete, the residue is easily removed with a clean, lint-free cloth, leaving a smooth, clear surface without observable scratches.

An important feature of the invention is the abrasive, preferably fine particles of tripoli or some other form of silica. Tripoli is a lightweight, siliceous sedimentary rock, consisting of leached-out silica which has been redeposited in a porous, friable form. Silica particles between 1 $\mu$m and 10 $\mu$m have been found to be surprisingly effective for polishing plastic surfaces without scratching. It is believed that this is due to the friable structure, of silica, which forms generally rounded particles without sharp edges when crushed to size and wetted with a suitable carrier. However, other abrasives with similar properties are anticipated to be useful also.

Another important feature of the present invention is the combination of ingredients. The abrasive particles are mixed with the lubricant (preferably a blend of lubricants of different weights), mineral spirits and water to form a polishing compound of the desired consistency. The lubricant keeps the compound workable in use, and lubricates the surface during polishing. The mineral spirits facilitates mixing and dispersion of the other ingredients. In addition, it penetrates to the surface of the workpiece, assuring complete wetting of the surface so the compound readily spreads into small surface scratches and blemishes. The water dilutes the compound to the desired consistency and serves as a carrier for the other ingredients. All the ingredients are readily available and inexpensive, and each contributes without countering or buffering the effect of the others. The combination of ingredients achieves a smooth, clear finish when used to polish a plastic surface.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 2 shows a microprobe spectrum of a tripoli particle of FIG. 1;

DETAILED DESCRIPTION OF A PREFERRED EMBODIMENT

Figure 1:
FIG. 1 is a scanning electron microscope (SEM) image of dry tripoli particles at 1,000×magnification.

A mixture containing fine particles of silica or an abrasive with similar properties, at least one petroleum distillate lubricant, mineral spirits and water has been found to be a surprisingly effective polishing compound for plastics such as PLEXIGLAS TM, LEXAN TM, LUCITE TM, and PVC. The abrasive consists of generally rounded particles without sharp edges, a substantial portion of the particles being no greater than approximately 10 microns in size. One unit of the compound contains these ingredients in approximately the following amounts by weight:

| Ingredient | Weight (g) | Parts (wt.) |
| --- | --- | --- |
| lubricant | 120–520 | 4–17 |
| mineral spirits | 30–180 | 1–6 |
| abrasive | 75–450 | 2.5–15 |
| water | 75–300 | 2.5–10 |

Preferably, the compound contains by weight approximately:

| Ingredient | Weight (g) | Parts (wt.) |
| --- | --- | --- |
| lubricant | 180–240 | 6–8 |
| mineral spirits | 30–155 | 1–5.2 |
| abrasive | 140–330 | 4.7–11 |
| water | 250–275 | 8.3–9.2 |

Coloring and fragrance agents, fillers, additional lubricants such as hydrogenated animal fat, tallow fats and triglycerides, and so forth may be added, preferably in an amount no greater than approximately 75–450 g (2.5–15 parts by weight). Thus, the product compound contains approximately 8–74 wt. % lubricant, 1.7–34 wt. % mineral spirits, 4.9–67 wt. % abrasive and 4.5–57 wt. % water. Preferably, the compound contains approximately 13–36 wt. % lubricant, 2.3–21 wt. % mineral spirits, 11–4.2 wt. % abrasive and 24–44 wt. % water.

A polishing compound with the preferred amounts of these ingredients has approximately the consistency of heavy cream. These proportions give a stable, easy-to-use compound for polishing plastic surfaces.

The lubricant facilitates uniform dispersion of the abrasive material and ensures effective, continuous lubrication of the surface during polishing. It keeps the polishing compound workable by helping to prevent drying of the compound as the water and mineral spirits evaporate during polishing. Preferably, a blend of petroleum distillate lubricants of different molecular weights is used, including at least one of the following or similar compositions: heavy naphthenic petroleum distillates such as those contained in the composition having Chemical Abstracts Service Registry No. (hereinafter, CAS No.) 64741-53-3, aliphatic petroleum distillates such as Stoddard solvent (CAS No. 8052-41-3), petroleum base oil such as Nujol (CAS No. 8012-95-1), pine oil (CAS No. 8002-09-03), turpentine (CAS No. 8006-64-2), and heavy aliphatic solvents (CAS No. 64742-96-7). It will be understood that compositions with similar viscosity and wetting characteristics may be used if desired. Preferably, the compound includes approximately 50–160 g heavy naphthenic distillates (at least approximately 9 wt. % of total lubricants) and approximately 0–75 g heavy aliphatic solvents (0–63 wt. % of total lubricants). That is, 100 g of the lubricant includes between approximately 9–42 g heavy naphthenic distillates and approximately 0–63 g heavy aliphatic solvents, although different amounts may be used if desired.

The mineral spirits component facilitates mixing and dispersion of the other ingredients, including the abrasive component. It penetrates to the surface of the workpiece, assuring complete wetting of the surface so the compound readily spreads into small surface scratches and blemishes. It also dissolves surface grease and removes any dirt on the surface at the start of polishing. The mineral spirits preferably includes at least approximately 95 wt. % hydrotreated petroleum distillates such as those in the compositions having CAS Nos. 64752-46-7, 64742-47-8, and 64742-53-6. However, any convenient mixture of hydrotreated petroleum distillates having the desired wetting properties may be used.

The water dilutes the compound to the desired consistency and serves as a carrier for the other ingredients. Although a compound having the above-listed ingredients outside the preferred ranges would have some cleaning and/or polishing action, the invention is based upon optimum results attained by following the preferred embodiment.

The abrasive is in the form of fine, generally rounded particles in a range of sizes. Most, and preferably substantially all of the particles are no greater than approximately 10 microns in size, more preferably no greater than approximately 5 microns in size. The preferred abrasive is tripoli silica, however, other abrasives such as diatomaceous earth may be useful.

Silica is a major constituent of tripoli, a lightweight, siliceous sedimentary rock that may range from white to reddish-brown in color depending on the impurities present. Tripoli is a breakdown product of siliceous limestones, consisting of leached-out silica which has been redeposited in a porous, friable form. It is normally processed by crushing to the approximate desired fineness, with or without further sorting of particles by size. The impurities commonly found in tripoli include trace amounts of iron and aluminum oxides or hydroxides; these do not affect the qualities and performance of the product compound.

The abrasive may be prepared by mixing tripoli with a liquid carrier ("wet" tripoli) and crushing to the desired range of particle sizes, or, alternatively, by dry crushing followed by wetting with the carrier. Suitable carriers include petroleum distillate lubricants such as those listed above, mineral spirits, turpentine, and other compositions with similar viscosities and wetting characteristics.

Scanning electron microscope (SEM) images of dry and wet tripoli samples were prepared at a range of magnifications. Samples were placed on aluminum pedestals, shielded with carbon-loaded, double-sided tape to hold the sample particles and prevent electrons from penetrating to the aluminum below. By analyzing the X-rays emitted by the target samples, the SEM can provide a qualitative analysis ("microprobe") of the elements present in those targets. Microbe analyses confirmed that the major constituent of the tripoli particles is silica.

A typical SEM image of dry tripoli at 1,000× magnification is shown in FIG. 1. The particle size was in the range of approximately 0–30 microns, with a substantial number of particles in the one-to-ten-micron range. Most of the particles appeared to be roughly spherical or egg-shaped; most of the larger particles appeared to be aggregates of loosely bound, individually recognizable particles in the one-to-two micron range.

A microprobe of one such particle is shown in FIG. 2. A first peak 10 at approximately 2 keV indicates that the particle contains a large amount of silicon, a second peak 12 indicates the presence of oxygen, and peaks 14 and 16 indicate the presence of much smaller amounts of aluminum and iron, respectively. No significant amounts of other metals were present. A few particles appeared relatively bright, for example, three grains at the upper left margin of FIG. 1. However, microprobe analyses showed no significant differences in composition between the brighter and the apparently darker grains. Therefore, the relative brightness of the grains is thought to be an artifact of geometry.

Figure 3A:
FIG. 3a is an SEM image of wetted tripoli particles at 1,000×magnification.
Figure 3B:
FIG. 3b is an SEM image of wetted tripoli particles at 2,000×magnification.

A paste was prepared by combining dry tripoli with a carrier (a mixture of mineral spirits :and other petroleum distillates). A sample of the resulting wet tripoli was applied to an aluminum pedestal, and SEM and microprobe analyses were performed as described above. As seen in FIG. 3a, the appearance of the individual tripoli particles changed after treatment with the carrier. The largest particle aggregates appeared to have broken up. A few grains were as large as 20 microns, but substantially all the visible particles were less than approximately 10 microns in size, with most particles in the one-to-five micron range. The smaller particles predominated, however, few particles appeared to be smaller than one micron. Most particles were generally rounded and smooth. At higher magnification (FIG. 3b), the tripoli particles still appeared generally rounded and smooth, with no obvious sharp edges, crystal faces or cleavage planes. While not wishing to be bound by theory, it is believed that mixing tripoli with the carrier helps break up aggregates of particles, resulting in a product that contains smaller, generally rounded particles that are less likely to scratch plastic surfaces.

The polishing compound is prepared as follows:

1. In an appropriately-sized vessel, slowly add the lubricant and mineral spirits to the abrasive while stirring. Stir until the mixture is smooth and uniform. As noted above, the abrasive is supplied in the form of fine particles, preferably with a substantial portion (preferably, substantially all) of the particles being less than approximately 10 microns in size and more preferably less than approximately 5 microns in size.

Alternatively, mix the abrasive with the carrier (a portion of the lubricant/mineral spirits fraction of the compound), crush to the desired particle size, then add the balance of the lubricant/mineral spirits. The abrasive may be mixed with an approximately equal volume of the carrier fluid, however, different proportions of abrasive and carrier may be used if convenient.

2. Slowly add the desired amount of water to the mixture while stirring. Agitate until the mixture forms a well-blended compound.

If not used immediately, the compound may be stored in a covered container to prevent evaporation of the water and volatile components. The compound is chemically stable, however, the abrasive particles and the other ingredients may settle out during prolonged storage. If this occurs, the compound is easily restored to its original consistency by stirring and/or shaking.

As will be evident to one of ordinary skill, the proportions of the ingredients may readily be varied within the ranges set forth in accordance with the particular application. Thus, thicker formulations containing relatively more abrasive are generally more effective as polishers, while thinner formulations containing relatively more liquid are useful as cleaners. Coloring agents may be added to modify the appearance of the compound, or stabilizing agents to prolong its shelf life. Ingredients having similar wetting, lubricating, and abrasive properties may be substituted for or added to those listed above without departing from the spirit and scope of the invention.

In use, a convenient amount of the compound is applied to a surface and used according to well-known polishing methods. Since the compound remains in workable condition on the polishing pad and the workpiece, polishing action and efficiency are maintained. The operator does not need to stop to clean dried material off the workpiece or polishing equipment and apply fresh compound, as with water-based polishes. When polishing is complete, the residue is easily removed with a clean, lint-free cloth.

Figure 4:
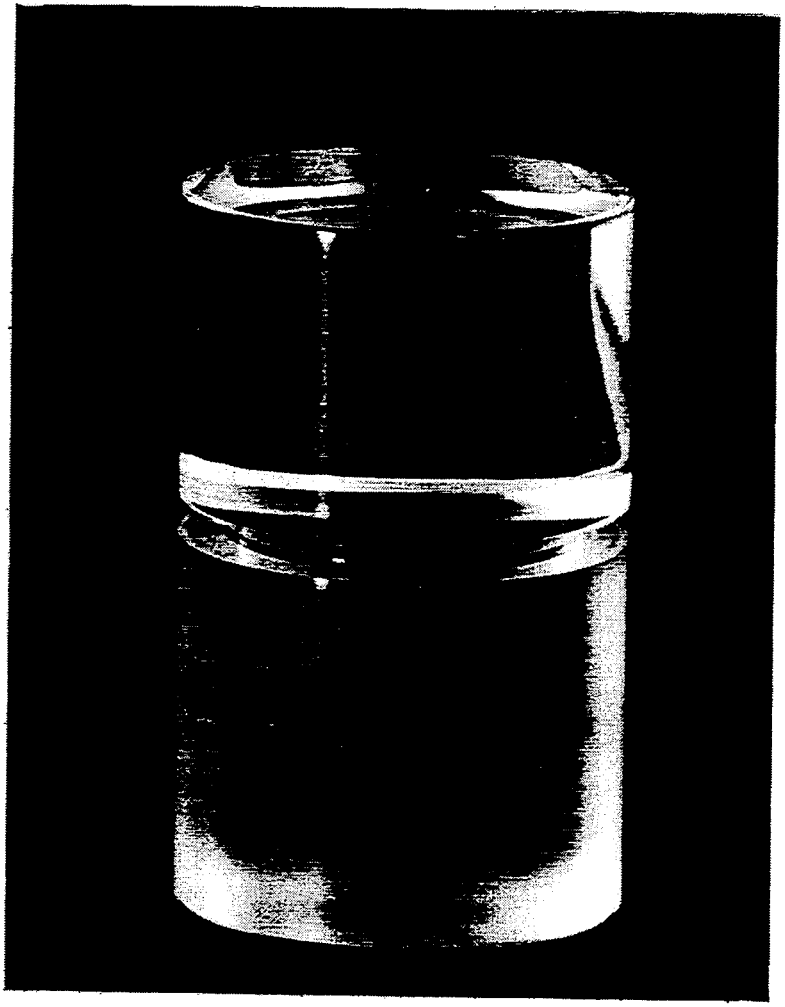
FIG. 4 shows a cut PLEXIGLAS TM rod having an upper portion polished with the compound of the present invention, and a lower, unpolished portion.

A rod machined of PLEXIGLAS TM and treated with the compound is shown in FIG. 4. The lower end of the rod was not polished; the upper end was polished using the compound according to the present invention. The surface is smooth and clear, without visible scratches.

If desired, the abrasive component of the compound may be supplied in an abrasive paste that contains approximately 30 wt. % to 60 wt. % of a suitable abrasive material in a binder. Preferably, the abrasive is tripoli having the desired range of particle sizes, although other abrasive materials that produce a polishing compound with the desired properties may be useful. Binders may include a blend of mineral spirits, turpentine and petroleum distillates such as those listed above, as well as other substances including hydrogenated animal fat, tallow fats and triglycerides, and coloring and fragrance agents. Abrasive pastes usable with the invention include automobile rubbing compounds such as those sold under the trademarks Speedy Orange Rubbing Compound, White Speedy Rubbing Compound, and Speedy Rubbing Compound (Martin-Senour Automotive Sales, Countryside, Ill). Other fine-grained abrasive pastes having similar properties may also be useful.

When prepared with such an abrasive paste, one unit of the compound includes the following ingredients in approximately these amounts:

| Ingredient | Weight (g) | Parts (wt.) | Wt. % |
| --- | --- | --- | --- |
| lubricant | 125–400 | 25–80 | 10–55 |
| mineral spirits | 5–60 | 1–12 | 0.3–12 |
| abrasive paste | 250–750 | 50–150 | 25–79 |
| water | 75–300 | 15–60 | 5.8–44 |

Preferably, the compound includes approximately the following amounts of these ingredients:

| Ingredient | Weight (g) | Parts (wt.) | Wt. % |
| --- | --- | --- | --- |
| lubricant | 185–210 | 37–42 | 17–22 |
| mineral spirits | 5–40 | 1–8 | 0.5–4.2 |
| abrasive paste | 475–550 | 95–110 | 48–56 |
| water | 250–275 | 50–55 | 24–29 |

The mineral spirits and the lubricant are similar in composition to those described above. The lubricant preferably includes approximately 50–160 g heavy naphthenic distillates (at least approximately 12 wt. %, more preferably at least approximately 24 wt. % of total lubricants).

The composition is prepared as follows:
1. Slowly add the lubricant to the abrasive paste while stirring to form a smooth, uniformly-blended mixture.
2. Add the mineral spirits, and stir to form a uniformly-blended mixture.
3. Slowly add water while stirring the mixture. Agitate until the mixture forms a well-blended compound.

The petroleum distillate lubricants and mineral spirits dissolve and disperse the abrasive paste to produce a smooth, uniformly blended mixture. Because the abrasive particles are uniformly dispersed throughout the compound, scratching due to settling or clumping is largely eliminated.

The amount of abrasive paste in the compound may vary within the range given above (50–150 parts by weight). For any given amounts of the liquid ingredients, a lesser admixture of abrasive paste results in a thinner compound and more time required to polish a surface. Conversely, the more paste, the thicker the polishing compound and the less polishing time, since the polishing efficiency of the compound is reduced if the abrasive content is too low. However, if too much paste is used, the viscosity of the compound is too high and it is less easy to use. Scratching may result if a coarse-grained paste is used. Thicker formulations are generally more effective as polishers, while thinner formulations are favored as cleaners.

It may be convenient to supply the mineral spirits in combination with a lubricant or lubricants. The polishing compound preferably includes a blend of lubricants of different weights, which may be provided by combining a lubricant/mineral spirits combination with a lubricant of different weight such as machine oil or spindle oil. The oil preferably includes approximately 95 wt. % or more heavy naphthenic petroleum distillates such as those contained in the composition having CAS No. 64741-53-3.

The lubricant/mineral spirits combination preferably includes about 5 wt. % to 20 wt. % mineral spirits (hydrotreated petroleum distillates) and approximately 65 wt. %–75 wt. % petroleum oils such as those contained in the compositions having CAS Nos. 8052-41-3 (Stoddard solvent), 8012-95-1 (Nujol), 64742-96-7, 64742-96-7, turpentine, or any convenient compositions with similar viscosity, volatility, and lubricating properties. If desired, other ingredients such as corrosion inhibitors;, and color and fragrance agents may be added without departing from the spirit of the invention. Suitable lubricant/mineral spirits combinations usable with the invention include those sold under the trademarks WD-40 (WD-40 Company, San Diego, Calif.), Kroil (Kano Laboratories, Inc., Nashville, Tenn.), and LPS 2 (LPS Laboratories, Inc., Tucker, Ga.). It will be clear, however, that any convenient mixture of petroleum distillates having similar volatility, viscosity, and wetting and lubricating properties may be used.

When formulated with such a lubricant/mineral spirits combination, one unit of the polishing compound includes the following ingredients:

| Ingredient | Parts (vol.) | Parts (wt.) |
| --- | --- | --- |
| lubricant/mineral spirits combination | 2–6 | 1.7–5.2 |
| machine oil | 1–3 | 1–3 |
| abrasive paste | 2–6 | 4.4–13.2 |
| water | 2–7 | 1.5–5.3 |

Preferably, the compound includes approximately:

| Ingredient | Parts (vol.) | Parts (wt.) | Wt. % |
| --- | --- | --- | --- |
| lubricant/mineral spirits combination | 4 | 3.5 | 19.5 |
| machine oil | 1 | 1 | 5.5 |
| abrasive paste | 4 | 8.8 | 50 |
| water | 6 | 4.5 | 25 |

A polishing compound according to the present invention can be used on PLEXIGLAS ™, LEXAN ™, LUCITE ™, PVC and similar plastic materials whenever a smooth, clear polished surface is desired. It is especially useful in finishing cut plastic surfaces to a clear finish. It may also be used to polish glass, ceramic, and metal surfaces. The compound provides good lubricating action to help prevent heat build-up and melting of the surface during polishing operations. It is oil-based, so it does not dry excessively during use. It is noncorrosive and easy to clean off equipment and parts. It is easy to produce and use, and formulated of inexpensive, readily-available ingredients.

It will be apparent to those skilled in the art that many changes and substitutions can be made to the preferred embodiment herein described without departing from the spirit and scope of the present invention as defined by the appended claims.

What is claimed is:

1. A polishing compound for plastic surfaces, said compound comprising:
    a mixture containing, by weight, approximately
    4 to 17 parts at least one petroleum distillate lubricant;
    1 to 6 parts mineral spirits;
    2.5 to 15 parts abrasive particles, said abrasive particles being generally rounded in form, a substantial portion of said abrasive particles being less than approximately 10 microns in size; and
    2.5 to 10 parts water.

2. The polishing compound as recited in claim 1, wherein said abrasive particles include silica.

3. The polishing compound as recited in claim 1, wherein said abrasive particles include tripoli.

4. The polishing compound as recited in claim 1, wherein a substantial portion of said abrasive particles are less than approximately 5 microns in size.

5. The polishing compound as recited in claim 1, wherein said at least one lubricant contains at least approximately 9 wt. % heavy naphthenic petroleum distillates.

6. The polishing compound as recited in claim 1, wherein said at least one lubricant contains between approximately 9 wt. % and 42 wt. % heavy naphthenic petroleum distillates.

7. The polishing compound as recited in claim 1, wherein said at least one lubricant contains up to 63 wt. % heavy aliphatic solvents.

8. The polishing compound as recited in claim 1, wherein said mixture contains by weight approximately 4.7 to 11 parts said abrasive particles.

9. A polishing compound for plastic surfaces, said compound comprising:
    a mixture containing approximately
    8 wt. % to 74 wt. % at least one petroleum distillate lubricant;
    1.7 wt. % to 40 wt. % mineral spirits;
    4.9 to 67 wt. % abrasive particles, said abrasive particles including silica, a substantial portion of said abrasive particles being less than approximately 10 microns in size; and
    4.5 to 57 wt. % water.

10. The polishing compound as recited in claim 9, wherein said abrasive particles include tripoli.

11. The polishing compound as recited in claim 9, wherein a substantial portion of said abrasive particles are less than approximately 5 microns in size.

12. The polishing compound as recited in claim 9, wherein said at least one petroleum distillate lubricant contains up to 63 wt. % heavy aliphatic solvents.

13. The polishing compound as recited in claim 9, wherein said at least one petroleum distillate lubricant contains between approximately 9 wt. % and 42 wt. % heavy naphthenic petroleum distillates.

14. The polishing compound as recited in claim 9, wherein said mixture contains between approximately 11 wt. % and 42 wt. % said abrasive particles.

15. The polishing compound as recited in claim 9, wherein said mixture contains approximately 13 wt. % to 36 wt. % said at least one lubricant, 2.3 wt. % to 21 wt. % said mineral spirits, 11 wt. % to 42 wt. % said abrasive particles, and 24 wt. % to 44 wt. % said water.

16. A process for preparing a polishing compound for plastic surfaces, said process comprising:
    adding approximately 4 to 17 parts by weight at least one petroleum distillate lubricant to approximately 2.5 to 15 parts by weight abrasive particles while stirring to form a first mixture, said abrasive particles including silica, a substantial portion of said abrasive particles being of a size less than approximately 10 microns;
    adding approximately 1 to 6 parts by weight mineral spirits to said first mixture and stirring to form a second mixture; and
    adding approximately 2.5 to 10 parts by weight water to said second mixture and agitating to form said compound.

17. The process as recited in claim 16, further comprising the step of providing a substantial portion of said abrasive particles in a size less than approximately 5 microns.

* * * * *